United States Patent
Joerg et al.

(10) Patent No.: US 6,480,785 B1
(45) Date of Patent: Nov. 12, 2002

(54) SYSTEM FOR DETERMINING A ROUTE AND PRESENTING NAVIGATIONAL INSTRUCTIONS THEREFOR

(75) Inventors: David S. Joerg, New York, NY (US); Jon D. McAuliffe, Berkeley, CA (US)

(73) Assignee: Vindigo, Inc., New York, NY (US)

( * ) Notice: Subject to any disclaimer, the term of this patent is extended or adjusted under 35 U.S.C. 154(b) by 0 days.

(21) Appl. No.: 09/655,818

(22) Filed: Sep. 6, 2000

(51) Int. Cl.⁷ ............................................. G01C 21/26
(52) U.S. Cl. ..................... 701/209; 701/201; 701/210; 340/990; 340/995
(58) Field of Search ................... 701/209, 201, 701/202, 204, 205, 210, 211; 340/990, 995

(56) References Cited

U.S. PATENT DOCUMENTS

| | | | |
|---|---|---|---|
| 4,954,958 A | 9/1990 | Savage et al. ............... 701/202 |
| 5,608,635 A | 3/1997 | Tamai ........................ 701/209 |
| 5,752,217 A * | 5/1998 | Ishizaki et al. ............. 701/201 |
| 5,899,955 A * | 5/1999 | Yagyu et al. ................ 340/995 |
| 5,944,769 A | 8/1999 | Musk et al. ................. 701/201 |
| 5,978,730 A | 11/1999 | Poppen et al. .............. 701/202 |
| 5,991,688 A * | 11/1999 | Fukushima et al. .......... 701/201 |
| 6,009,403 A | 12/1999 | Sato ............................... 705/6 |
| 6,016,485 A | 1/2000 | Amakawa et al. ........... 705/400 |
| 6,026,384 A | 2/2000 | Poppen ........................ 705/400 |
| 6,038,509 A | 3/2000 | Poppen et al. .............. 701/210 |
| 6,047,236 A | 4/2000 | Hancock et al. ............. 701/208 |
| 6,134,501 A * | 10/2000 | Oumi ........................... 701/201 |
| 6,230,099 B1 * | 5/2001 | Fabian ......................... 701/209 |
| 6,278,943 B1 * | 8/2001 | Yamauchi ..................... 340/988 |

* cited by examiner

*Primary Examiner*—Tan Nguyen
(74) *Attorney, Agent, or Firm*—Morrison & Foerster LLP

(57) ABSTRACT

A system for determining a route and presenting navigational instructions therefor preferably includes a plurality of map records including a plurality of business records each identifying a business, a plurality of street records each identifying a street, and a plurality of node records each identifying a node. The system preferably further includes a computation module adapted to execute an algorithm for determining a route between a source location and a destination location using at least one of the map records. The algorithm is preferably adapted to manipulate a graph representation having vertices and edges, wherein each of the vertices corresponds to a respective one of the streets, each of the streets corresponds to exactly one of the vertices, each node corresponds to at least one of the edges, and each edge corresponds to exactly one node.

12 Claims, 5 Drawing Sheets

SYSTEM FOR DETERMINING A ROUTE AND PRESENTING NAVIGATIONAL INSTRUCTIONS THEREFOR

FIELD OF THE INVENTION

This invention relates generally to systems for providing directions to travelers and more specifically to systems for determining a route and presenting navigational instructions therefor.

BACKGROUND OF THE INVENTION

Recent years have seen a rapid proliferation of devices that provide mobile access to electronic information, such as handheld computers, pagers and data-enabled cellular telephones. One compelling property of such handheld devices is their capacity to organize information dynamically according to the relative physical locations of the user, points of interest to the user, and available navigable pathways of various kinds. However, these devices do not determine a route between specified physical locations and do not present navigational instructions for traversing the route.

Related patents include the following. U.S. Pat. No. 6,047,236 "GEOGRAPHIC LOCATION REFERENCING SYSTEM AND METHOD" discloses an addressing scheme that allows physical locations to be globally uniquely addressed and specified, including via automatic position acquisition using a global positioning system. However, it does not include the generation and presentation of navigational directions.

U.S. Pat. No. 6,038,509 "SYSTEM FOR RECALCULATING A PATH" discloses the use of caching to accelerate recalculation of directions when deviation from an originally prescribed path occurs. U.S. Pat. No. 6,016,485 "SYSTEM FOR PATHFINDING" discloses the use of pre-computed sub-paths to accelerate the computation of minimal-cost routes in a network.

U.S. Pat. No. 6,026,384 "COST ZONES" discloses a technique for determining and displaying which destinations on a digital map have distances from a given location that are within a fixed cost according to a chosen cost function. However, it does not disclose the generation or presentation of navigational directions, either to destinations within the cost zone or otherwise.

U.S. Pat. No. 6,009,403 "TRAVEL PLAN PREPARING DEVICE" discloses a system for describing a kind of service and receiving information about areas near a travel route in which such service locations exist. A particular area can be specified, and the kinds of services available in that area are subsequently described. However, it does not disclose the generation or presentation of navigational directions that satisfy particular criteria.

U.S. Pat. No. 5,978,730 "CACHING FOR PATHFINDING COMPUTATION" discloses the background execution of a path-finding algorithm without instigation by a user, such that a pre-loaded cache of data and routes relevant to a routing request are available whenever the request is made. It further discloses a particular method, using Dijkstra's algorithm, for determining directions in a graph representing a map. The graph representation disclosed includes vertices that correspond to individual traversable segments conjoining pathway intersections, such that the vertices of the graph representation do not correspond to entire contiguous traversable pathways that potentially span multiple intersections, and such that every such intersection is not represented as an edge incident to the pathway's vertex.

U.S. Pat. No. 5,944,769 "INTERACTIVE NETWORK DIRECTORY SERVICE WITH INTEGRATED MAPS AND DIRECTIONS" discloses a networkbased system to communicate directory information with corresponding locale data, and discloses direction-finding functionality.

U.S. Pat. No. 4,954,958 "DIRECTIONAL INFORMATION SYSTEM" discloses related functionality.

Related commercial products include services from Kivera, a company that licenses location-based services to network access providers for mobile devices. One service is direction-finding.

SUMMARY OF THE INVENTION

The invention provides a system for determining a route and presenting navigational instructions therefor. The invention in one aspect enables a user to obtain instructions for travelling from any one selected location on a particular geophysical grid to any other location via real-world means of transit. Although the invention does not restrict utilization to a particular medium of computation, an embodiment includes a computation module as part of a client application resident on a handheld device having at least one locally cached database of geospatial information. The user may specify a source location (e.g., his or her current location) to the device. Additionally or alternately, the source location may be acquired automatically via global positioning technology. The computation module may alternatively be part of a remote server that receives a request from a handheld device that is wirelessly networked to the server.

Once the computation module receives the source location information and destination location information, the computation module dynamically determines a route between the source location and the destination location. The determination of the route preferably balances descriptive simplicity of the route with a minimal total distance traversed along the route. Prior art systems optimize for distance, time or simplicity individually but not in combination.

Once the route has been determined, a presentation module of the computation module provides a natural language description of the actions the user must take to follow the route. The available pathways may include one- and two-way streets, subway systems, bus routes, overland railways and/or any other form of transit. The instructions may be tailored to users who are on foot or in vehicles, and they may be enhanced with information directed to known characteristics of the user. For example, the presentation module may instruct the user to pass by or turn at specific apparent landmarks that are likely to be of interest to him or her.

In an embodiment, the system includes a plurality of map records including a plurality of business records each identifying a business, a plurality of street records each identifying a street, and a plurality of node records each identifying a node. As used herein, a "node" is defined as any uniquely specified location where traversable pathways coincide, a "business" is defined as any physical location represented in the system that a user might want to obtain information about, and a "street" is defined as any contiguously traversable pathway via which a person can move among a set of nodes on which the pathway is incident. The business records, street records, and node records are preferably maintained in a business database, a street database, and a node database, respectively.

The system preferably further includes a computation module that can access the map records and execute an algorithm for determining a route between a source location and a destination location using at least one of the map records. The computation module can receive source location information and use it to identify the source location, and can receive destination location information and use it to identify the destination location. The computation module determines a set of source streets associated with the source location and a set of destination streets associated with the destination location. The route between the source location and the destination location, as determined by the computation module, includes a desired solution path between a source street in the set of source streets and a destination street in the set of destination streets, as determined by the algorithm. The algorithm can be biased to discover, when multiple simplest paths exist, that simplest path which traverses the minimum physical distance. Therefore, when at least two of a plurality of possible routes between the source location and the destination location are the simplest routes (i.e., both require an identical minimum number of street changes), the algorithm preferably is biased toward determining the physically shortest route (i.e., the route traversing the minimum physical distance) of the at least two possible routes.

The system preferably further includes a presentation module adapted to generate and present navigational instructions for traversing the route. In one aspect, the presentation module interprets the route, as determined by the computation module, into natural language navigational instructions that may be tailored using at least one of demographic information pertaining to the user, a preference of the user, a characteristic of the user, a characteristic of a handheld device being used by the user, information stored in the handheld device, and a characteristic of one of the businesses, one of the streets, and/or one of the nodes.

The computation module can preferably be adapted to interact with the user while executing the algorithm. For example, the computation module may provide status updates to the user to indicate that the route determination is proceeding correctly, and may temporarily suspend the algorithm to execute an interface routine that checks for user requests (e.g., to cancel the determination of the route).

DETAILED DESCRIPTION OF THE INVENTION

The invention provides systems for determining a route and presenting navigational instructions therefor. In an embodiment, the system includes a plurality of map records identifying a plurality of mapped objects. In one aspect, the map records include a plurality of business records, a plurality of street records, and a plurality of node records. In this aspect, for example, each of the business records identifies a business, each of the street records identifies a street, and each of the node records identifies a node.

As used herein, a "node" is defined as any uniquely specified location where traversable pathways coincide. For example, the location can be parameterized by an <x, y> coordinate pair relative to a fixed frame of reference. Latitude and longitude form an exemplary suitable coordinate system. As used herein, a "business" is defined as any physical location represented in the system that a user might want to obtain information about. It need not be a site at which commercial activity takes place. For example, a business can be any destination having a street address (e.g., as assigned by a government postal service) and/or an associated coordinate pair in a coordinate system. As used herein, a "street" is defined as any contiguously traversable pathway via which a person can move among a set of nodes on which the pathway is incident. For example, this can be a street as commonly defined (e.g., a physical road), but when a physical road consists of discontiguous segments, each of the segments would constitute a separate street by the terminology used herein. For another example, when a physical road forks, such that both branch roads bear the name of the trunk road, the trunk road and one of the branch roads would together constitute a street by the terminology used herein, while the other branch road would constitute a separate street by the terminology used herein. For another example, a bus route, a subway line, a railroad line, or some other method of transit could constitute a street by the terminology as used herein. A street can be one- or two-way.

Figure 1:
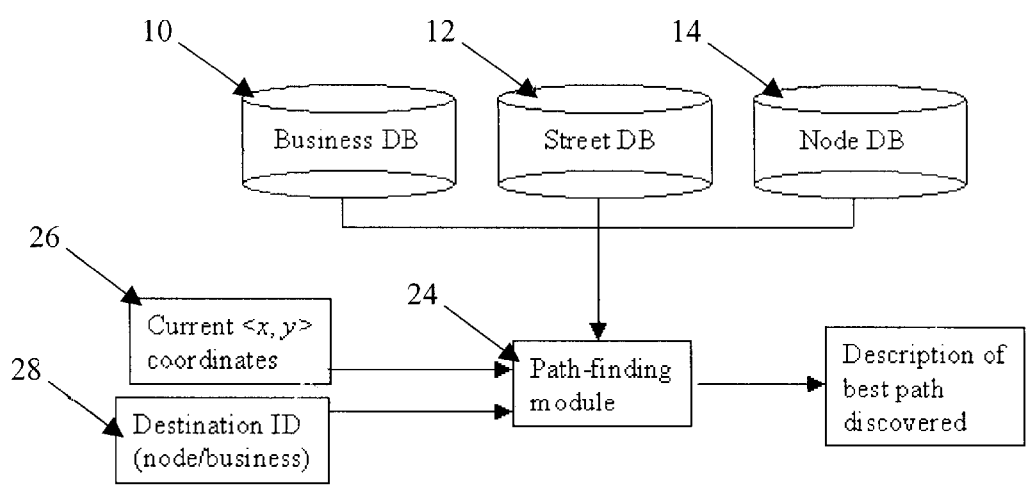
FIG. 1 illustrates an exemplary structure of a system of the invention.

FIG. 1 illustrates an exemplary structure of the invention. The business records are preferably maintained in at least one business database 10. The street records are preferably maintained in at least one street database 12. The node records are preferably maintained in at least one node database 14.

Each of the business records can include at least one of a business unique identifier, a business street identifier and a business coordinate pair. The business unique identifier is an identifier for the business that can be used to identify it from among the other businesses identified in the business database. No business identified in the business database has a unique identifier identical to the unique identifier of another business identified in the business database. The business street identifier is an identifier for the street on which the business resides. If an identified business resides on multiple streets, a street from among those streets can be chosen heuristically. The business coordinate pair is a coordinate pair that identifies the location of the business relative to a fixed frame of reference. For example, the business coordinate pair can be an <x, y> coordinate pair. Each business record can also include additional information that is extraneous to the direction-finding computation discussed below.

Each of the street records can include at least one of a street unique identifier, a street name identifier, at least one incident node identifier, and a one-wayness indicator. The street unique identifier is an identifier for the street that can be used to identify it from among the other streets identified in the street database. No street identified in the street database has a unique identifier identical to the unique identifier of another street identified in the street database. The street name identifier is an identifier for a name (preferably the most commonly used name) of the street. Each incident node identifier is an identifier for a respective node to which the street is incident. The number of incident node identifiers in the street record equals the number of nodes to which the street is incident. The incident node identifiers are preferably arranged in the street record according to their positions in a connection order along the street. These positions will be discussed in detail below. The one-wayness indicator is an indicator as to whether the street is a one-way street or a two-way street. Each street record can also include additional information that is extraneous to the direction-finding computation discussed below.

Each of the node records can include a node unique identifier, at least one intersecting street identifier, a node coordinate pair, and at least one transition constraint governing traversal of the node. The node unique identifier is an identifier for the node that can be used to identify it from among the other nodes identified in the node database. No node identified in the node database has a unique identifier identical to the unique identifier of another node identified in the node database. Each intersecting street identifier is an identifier for a respective street that intersects the node. The number of intersecting street identifiers in the node record equals the number of streets intersecting the node. The term "intersect" as used herein should be broadly interpreted to include not only an intersection of streets as it is commonly defined, but also, for example, the presence of a subway station entrance on a physical street. The node coordinate pair is a coordinate pair that identifies the location of the node relative to a fixed frame of reference that is the same fixed frame of reference used with the business coordinate pairs. For example, the node coordinate pair can be an <x, y> coordinate pair. The transition constraint identifies constraints on traversing from one street to another at the node. Each node record can also include additional information that is extraneous to the direction-finding computation discussed below.

Figure 2:
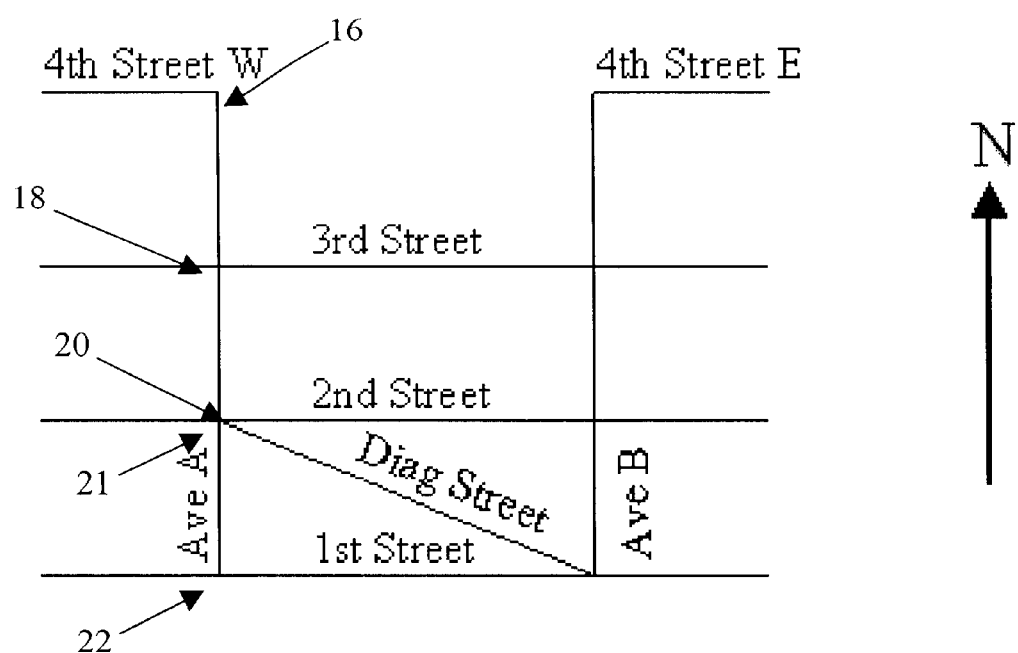
FIG. 2 shows an exemplary street map for use in explaining the invention.

FIG. 2 shows an exemplary street map for use in explaining the invention. The connection order positions of the nodes identified by the incident node identifiers with respect to the street to which the nodes are incident is determined by beginning at one end of the street and upon encountering each node, assigning a connection order position (e.g., beginning at "first", then continuing with "second", "third", etc. as needed; or, e.g., beginning at "1", then continuing with "2", "3", etc. as needed) to the encountered node, until all nodes on the street have been encountered and have been assigned a connection order position. For example, Avenue A has four incident nodes: the intersection 16 with 4th Street W, the intersection 18 with 3rd Street, the intersection 20 with 2nd Street, the intersection 21 with Diagonal Street, and the intersection 22 with 1st Street. If the connection order is determined beginning at the north end of Avenue A, the connection order positions of intersection 16, intersection 18, intersection 20, intersection 21, and intersection 22 are first, second, third, fourth, and fifth, respectively. If the connection order is determined beginning at the south end of Avenue A, the connection order positions of intersection 22, intersection 21, intersection 20, intersection 18, and intersection 16 are first, second, third, fourth, and fifth, respectively.

In the embodiment, the system further includes a computation module 24 that can access the map records. For example, the computation module 24 can access the business records in the business database 10, the street records in the street database 12, and the node records in the node database 14. The computation module 24 further executes an algorithm for determining a route between a source location and a destination location using at least one of the map records. For example, the computation module 24 uses at least one of the business records, at least one of the street records and/or at least one of the node records.

The computation module 24 is adapted to receive source location information 26 and use the source location information to identify the source location. The source location is associated with at least one of a business identified by at least one of the business records, a street identified by at least one of the street records, and a node identified by at least one of the node records. The computation module 24 is further adapted to receive destination location information 28 and use the destination location information to identify the destination location. The destination location information is associated with at least one of a business identified by at least one of the business records, a street identified by at least one of the street records, and a node identified by at least one of the node records.

The source location information 26 can be information identifying the user's current physical location as the source location. The source location information can be made available to the computation module either manually (e.g., input by the user by any means known in the art) or automatically (e.g., determined using at least one component of a position-finding system, such as a global positioning system, including by wireless data transfer). For example, if the user's current location is an intersection of two streets, the user may provide the names of the two streets to the computation module as the source location information, and the computation module can use the street records and the node records to determine the source location as the coordinate pair of the node that represents the intersection of the two streets.

The destination location information 28 can be information identifying the user's desired physical location (e.g., where he/she wants to go). The destination location information can be made available to the module manually (e.g., input by the user by any means known in the art). When the user is unfamiliar with available destinations in an area, the destination location information may include at least one search parameter that is used by at least one of the computation module and another computation module to choose a destination location. For example, if the user desires to go to the train station, the user may provide the name of the train station to the computation module as the destination location information, and the computation module can use the business records to determine the destination location as the coordinate pair of the business that is the train station.

At least one of the source location information and the destination location information can be a coordinate pair, a latitude, a longitude, a signal from a global positioning system, at least a portion of a street name, at least a portion of a landmark name, at least a portion of a building name, at least a portion of a company name, at least a portion of a street address, at least a portion of a name of a transit station, and at least a portion of a name of a government facility.

Referring again to FIG. 2, for example, if the user's current location is the intersection 16 of 4th Street W and Avenue A, the user may provide the name "4th Street W" and the name "Avenue A" to the computation module as street names, and the computation module can use the street records and the node records to determine the source location as the coordinate pair of the node that represents the intersection 16 of 4th Street W and Avenue A. Further, for example, if the user desires to go to a business located on 4th Street E, the user may provide the name of the business to the computation module as the destination location information, and the computation module can use the business records, the street records and the node records to determine the destination location as the coordinate pair of the business on 4th Street E.

Once the computation module identifies the source location from the source location information and the destination location from the destination location information, the computation module is adapted to determine a set of source streets associated with the source location and a set of destination streets associated with the destination location. If the source location is the coordinate pair of a node, every street incident to that node is included in the set of source streets. The streets incident to that node can be identified by the intersecting street identifiers in the node record for that node. For example, if the source location is the coordinate pair of the node that represents the intersection 16 of 4th Street W and Avenue A, the intersecting street identifiers in the node record of that node will indicate that both 4th Street W and Avenue A are streets incident to that node, and both will be included in the set of source streets. If the destination location is the coordinate pair of a business, the street on which the business is located is included in the set of destination streets. For example, if the destination location is the coordinate pair of the business on 4th Street E, 4th Street E is included in the set of destination streets. Similarly, if the destination location is the coordinate pair of a business located at an intersection, every street incident to the node representing that intersection is included in the set of destination streets.

As stated above, the computation module is adapted to execute an algorithm for determining a route between the source location and the destination location. In an embodiment, the route is a simplest route of a plurality of possible routes between the source location and the destination location. The term "simplest" as used herein is defined as a minimum number of street changes. A breadth-first search algorithm can be used to determine the simplest route. In another embodiment, the route is a minimum cost route of a plurality of possible routes between the source location and the destination location. The minimum cost route presents at least one of a minimum amount of tolls, a minimum amount of transportation fees, a minimum amount of expected danger, a minimum amount of expected traffic congestion, and a minimum travel time. An algorithm in which the streets can be weighted to account for such costs, such as Dijkstra's algorithm or the Bellman-Ford algorithm, can be used to determine such a minimum cost route.

Figure 3:
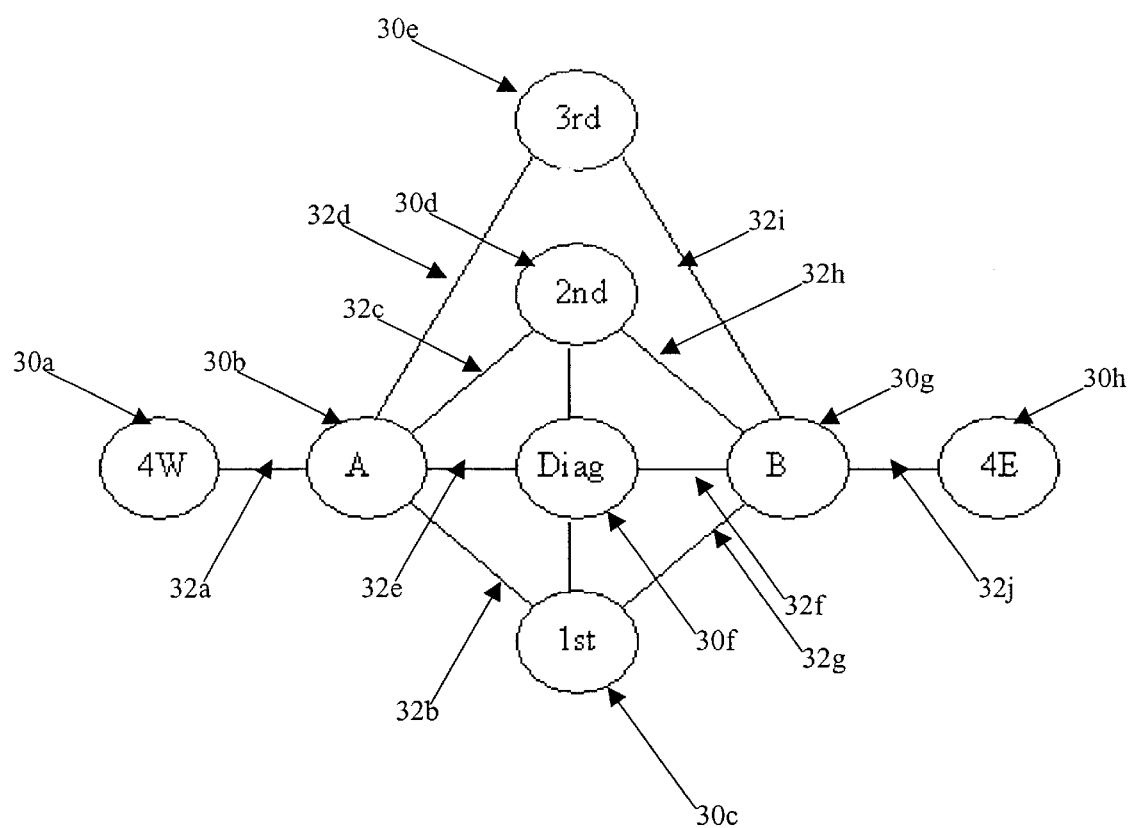
FIG. 3 illustrates an exemplary graph representation of the map of FIG. 2 that can be used by an exemplary algorithm of the invention.

While the algorithm can be adapted to manipulate any graph representation of the mapped objects, the algorithm is preferably adapted to manipulate a graph representation having vertices and edges, wherein each of the vertices corresponds to a respective one of the streets, each of the streets corresponds to exactly one of the vertices, each node corresponds to at least one of the edges, and each edge corresponds to exactly one node. FIG. 3 illustrates an exemplary graph representation G=(V, E). Each vertex v in V corresponds to a street in the street database, and an edge (u, v) appears in E if and only if streets u and v intersect at some node in the node database. The graph representation G may be weighted (e.g., when using the algorithm to determine the minimum cost route mentioned above), in which case each edge e has an associated cost c(e). FIG. 3 shows exemplary vertices corresponding to 4th Street W at 30a, Avenue A at 30b, 1st Street at 30c, 2nd Street at 30d, 3rd Street at 30e, Diagonal Street at 30f, Avenue B at 30g and 4th Street E at 30h. FIG. 3 also shows exemplary edges corresponding to the intersections of 4th Street W and Avenue A at 32a, Avenue A and 1st Street at 32b, Avenue A and 2nd Street at 32c, Avenue A and 3rd Street at 32d, Avenue A and Diagonal Street at 32e, Avenue B and Diagonal Street at 32f, Avenue B and 1st Street at 32g, Avenue B and 2nd Street at 32h, Avenue B and 3rd Street at 32i, and Avenue B and 4th Street E at 32j.

When the algorithm is adapted to manipulate the preferred graph representation, and the computation module is adapted to determine a simplest route of a plurality of possible routes between the source destination and the source location, the algorithm can include any shortest-path algorithm known in the art that can manipulate the preferred graph representation to determine a simplest path between some member of the set of source streets and some member of the set of destination streets. For example, such a shortest-path algorithm determines a minimum cost sequence of streets between some member of the set of source streets and some member of the set of destination streets, and when the graph representation is unweighted, minimum cost means a minimum distance along the sequence of streets, so that the resulting path presents the fewest number of street changes to the traveler. An exemplary shortest-path algorithm that can be used to manipulate an unweighted graph representation is a breadth-first search algorithm.

When the algorithm is adapted to manipulate the preferred graph representation, and the computation module is adapted to determine a minimum cost route of a plurality of possible routes between the source destination and the source location, the algorithm can include any shortest-path algorithm known in the art that can manipulate the preferred graph representation to determine a minimum cost path between some member of the set of source streets and some member of the set of destination streets. For example, such a shortest-path algorithm determines a minimum cost sequence of streets between some member of the set of source streets and some member of the set of destination streets, and when the graph representation is weighted, minimum cost means a minimum sum of the costs associated with each edge along the sequence of streets, so that the resulting path presents the minimum cost to the traveler. Exemplary shortest-path algorithms that can be used to manipulate a weighted graph representation are Dijkstra's algorithm or the Bellman-Ford algorithm.

In certain embodiments, the computation module is further adapted to exclude a subset of the edges in E from consideration by the algorithm, thereby making the determination of the route more efficient. The computation module can be adapted to determine a source-to-destination vector having a source end at the source location and a destination end at the destination location. The computation module can be further adapted to determine a source corridor vector perpendicular to the source-to-destination vector and to determine a destination corridor vector perpendicular to the source-to-destination vector, such that the source corridor vector and the destination corridor vector define a corridor area therebetween that contains the source location and the destination location. For example, the corridor area would be the set of all <X, y> coordinate pairs that are enclosed by the parallel source corridor and destination corridor vectors that enclose the source location and the destination location. All of the nodes outside this corridor area are then excluded from consideration by the algorithm. None of the node records used by the algorithm identifies a node outside the corridor area. For example, every edge e in E corresponding to a node having an <x, y> coordinate pair that is not in the corridor area is removed from E prior to the execution of the algorithm. Therefore, the algorithm does not explore a possible route when a portion of the possible route falls outside the corridor area.

The source corridor vector may pass through the source location and/or the destination corridor vector may pass through the destination location. However, in some cases this results in desired routes being undetermined by the computation module. For example, if a node representing an exit ramp of a major highway is very close to the destination location but is outside the corridor area, a desired route that uses that major highway to reach the destination location may be undetermined. In such a case and other cases, it may be preferable to broaden the corridor area by moving the source corridor vector such that it no longer passes through the source location and/or moving the destination corridor vector such that it no longer passes through the destination location.

The route between the source location and the destination location, as determined by the computation module, includes the desired solution path between a source street in the set of source streets and a destination street in the set of destination streets, as determined by the algorithm. The computation module can be adapted to commence the determination of the route from the source location to the destination location, and/or from the destination location to the source location, because the algorithm can be adapted to commence the determination of a desired solution path from any source street in the set of source streets to any destination street in the set of destination streets, and/or any destination street in the set of destination streets to any source street in the set of source streets. The algorithm is preferably adapted to commence the search for the desired solution path from any destination street in the set of destination streets and terminate when any source street in the set of source streets is reached. During the search, the algorithm preferably keeps track of the predecessor street of each street along the developing solution path, such that when any source street in the set of source streets is reached, the desired solution path can be determined by recalling the predecessor of the source street, then that street's predecessor, and so on to the destination street (that has no predecessor). The resulting route is then conveniently represented from the source location to the destination location.

In the preferred embodiment, the algorithm manipulates a graph representation having a plurality of vertices and a plurality of edges, with each edge representing an adjacency between two of the vertices as described above. The algorithm designates a source vertex from among the vertices that represents a beginning street that is one of a source street in the set of source streets and a destination street in the set of destination streets. The algorithm also designates a destination vertex from among the vertices that represents an ending street that is the other of the source street and the destination street. The algorithm then designates the source vertex as "seen", designates each remaining vertex as "unseen", and places the source vertex in a head position of a first-in-first-out queue. The algorithm thereafter executes a loop while the destination vertex is designated as "unseen" and the queue is not empty. In the loop, when all vertices adjacent to the head-positioned vertex are "seen", the algorithm removes the head-positioned vertex from the queue, and, when a next vertex is next in the queue, places that next vertex in the head position. Alternatively in the loop, when at least one vertex adjacent to the head-positioned vertex is designated as "unseen", the algorithm considers in a consideration order each unseen vertex adjacent to the head-positioned vertex, and, after all of the unseen vertices adjacent to the head-positioned vertex have been considered, removes the head-positioned vertex from the queue and, when a next vertex is next in the queue, places that next vertex in the head position. Each of the vertices cannot be simultaneously designated as both "seen" and "unseen".

Known shortest-path algorithms do not specify the order in which the vertices adjacent to the head-positioned vertex are considered. As stated above, a vertex is adjacent to the head-positioned vertex when the vertex represents a street that intersects the street represented by the head-positioned vertex. The algorithm of the invention can be adapted to consider the adjacent vertices in a consideration order such that when multiple shortest paths exist in G, the algorithm has a tendency to discover that shortest path which traverses the minimum physical distance. In this context, the shortest path will be referred to as the "simplest path" (e.g., the path with the minimum number of street changes), and a reference to the "physically shortest path" will mean a path traversing a minimum physical distance. Therefore, when at least two of a plurality of possible routes between the source location and the destination location are the simplest routes (i.e., both require an identical minimum number of street changes), the algorithm preferably is biased toward determining the physically shortest route (i.e., the route traversing the minimum physical distance) of the at least two possible routes. This biasing can be accomplished by ordering in the consideration order as described in greater detail below.

The consideration order can be established by each unseen vertex adjacent to the head-positioned vertex having associated therewith a position in a connection order relative to the head-positioned vertex. In the ongoing example, each of the unseen 1st Street, Diagonal Street, 2nd Street and 3rd Street vertices has a position in a connection order relative to the Avenue B vertex. By way of explanation, recalling again FIG. 2 and its related discussion, a position in a connection order is established for each of the nodes incident to each street in the database. As stated above, the position in the connection order of the nodes identified by the incident node identifiers with respect to the street to which the nodes are incident is determined by beginning at one end of the street and upon encountering each node, assigning a connection order position to the encountered node, until all nodes on the street have been encountered and have been assigned a connection order position. In the ongoing example, Avenue B has five nodes $32f$, $32g$, $32h$, $32i$, $32j$ that can be positioned in a connection order, and that would be positioned in the connection order as fourth (or assigned a position #4), fifth (or assigned a position #5), third (or assigned a position #3), second (or assigned a position #2) and first (or assigned a position #1), respectively (when starting at the north end of the street and preferring Diagonal Street over 1st Street). Therefore, in the ongoing example, in the graph representation, the Avenue B vertex has five edges $32f$, $32g$, $32h$, $32i$, $32j$ that represent adjacencies of the Avenue B vertex and the five vertices $30f$, $30c$, $30d$, $30e$, $30h$, respectively, such that each of the five vertices $30f$, $30c$, $30d$, $30e$, $30h$ can be associated with a position in the connection order. Such positions in the connection order would be fourth (or assigned a position #4), fifth (or assigned a position #5), third (or assigned a position #3), second (or assigned a position #2) and first (or assigned a position #1), respectively (when starting at the north end of the street and preferring Diagonal Street over 1st Street).

The consideration order is further established by pairing a first unconsidered vertex and, when available, a second unconsidered vertex. The first unconsidered vertex is an unconsidered vertex next in one of increasing connection order position and decreasing connection order position from an entrance connection order position. The second unconsidered vertex is an unconsidered vertex next in the other of increasing connection order position and decreasing connection order position from the entrance connection order position. If the second unconsidered vertex is not available, it is not paired. That is, in certain aspects of the invention, as will be discussed below with reference to enqueueing the paired vertices for consideration, a pair cannot be made because either no unconsidered vertices remain in one of increasing connection order position and decreasing connection order position from the entrance order position, and thus a second unconsidered vertex is not available for pairing.

When the head-positioned vertex is the source vertex, the entrance connection order position is a connection order position, relative to the head-positioned vertex, of a vertex adjacent to the head-positioned vertex. This aspect accounts for the source vertex having no predecessor because the source vertex is the initial vertex in the head-position of the FIFO queue. The vertex adjacent to the head-positioned vertex that is chosen for the connection order position can be chosen arbitrarily. Preferably, it is chosen because the intersection represented by the edge representing the adjacency between that vertex and the head-positioned vertex is closest in physical proximity to the destination location when compared with the proximities, to the destination location, of other intersections (if any) represented respectively by edges representing respective adjacencies between other vertices and the head-positioned vertex.

When the head-positioned vertex is not the source vertex, the entrance connection order position is the connection order position, relative to the head-positioned vertex, of the predecessor vertex of the head-positioned vertex. This aspect accounts for the other vertices that are subsequently placed in the head position of the FIFO queue, because these vertices have predecessors that have been assigned during the search as described above. In the ongoing example, as stated above, the entrance connection order position would be the connection order of the 4th Street E vertex, because the 4th Street E vertex has been designated as a predecessor of the Avenue B vertex.

The ongoing example best illustrates the case when no unconsidered vertices are in decreasing connection order position from the entrance connection order position, and thus a second unconsidered vertex is not available for pairing. More specifically, in the ongoing example, no pairing would occur for the vertices adjacent to the Avenue B vertex because only unconsidered vertices in increasing connection order position from the entrance connection order position (i.e., first) are available. Therefore, the vertices adjacent to the Avenue B vertex would be considered in increasing connection order position from the entrance connection order position without being paired.

An alternate example best illustrates a case where the algorithm arrives at the Avenue B vertex 30g using the edge 32h. In such an example, the 2nd Street vertex 30d would then be designated as seen and designated as a predecessor of the Avenue B vertex 30g. Recall that the 4th Street E vertex 30h, the 3rd Street vertex 30e, the 2nd Street vertex 30d, the Diagonal Street vertex 30f, and the 1st Street vertex 30c are first, second, third, fourth, and fifth, respectively, in connection order relative to the Avenue B vertex 30g (when Diagonal Street is preferred over 1st Street). Therefore, the entrance connection order position is third (because the 2nd Street vertex 30d is third in connection order relative to the Avenue B vertex 30g). Thus, in a first iteration, the unconsidered vertex next in decreasing connection order position from the entrance connection order position (in this example, third) would be the 3rd Street vertex 30e, because the 3rd Street vertex is second in connection order relative to the Avenue B vertex 30g, and the unconsidered vertex next in increasing connection order position from the entrance connection order position (in this example, third) would be the Diagonal Street vertex 30f, because the Diagonal Street vertex 30f is fourth in connection order relative to the Avenue B vertex 30g.

The consideration order is further established by ordering according to a preference order the paired first unconsidered vertex and second unconsidered vertex. If no pair can be created, such as in the ongoing example, the preference order may not be established, and the unconsidered vertices are considered in increasing (or decreasing) connection order position from the entrance connection order position.

The consideration order is further established by enqueueing for consideration (according to the preference order) at least one of the first unconsidered vertex and the second unconsidered vertex. This means that one or both of the first unconsidered vertex and the second unconsidered vertex are enqueued in the preference order for consideration. In a certain aspect, only the first in preference order will be enqueued, and the second in preference order will become a member of the next pair of vertices that is created as described above. In the alternate example, using this aspect, where the 3rd Street vertex and the Diagonal Street vertex would be paired, and the 3rd Street vertex is first in preference order, the 3rd Street vertex will be enqueued for consideration and the Diagonal Street vertex will become a member of the next pair that is created as described above. In another aspect, both the first unconsidered vertex and the second unconsidered vertex are enqueued in the preference order for consideration. In the alternate example, using this aspect, where the 3rd Street vertex and the Diagonal Street vertex would be paired, and the 3rd Street vertex is first in preference order, the 3rd Street vertex will be enqueued for consideration first and the Diagonal Street vertex will be enqueued for consideration second.

The preference order in one aspect sorts the paired vertices according to their physical distance from the entrance intersection. The preference order in this aspect can be established by the head-positioned vertex having associated therewith an entrance intersection that is the intersection represented by the edge used by the algorithm to find the head-positioned vertex. In the ongoing example, the entrance intersection is the intersection of 4th Street E and Avenue B. The preference order in this aspect can be further established by each of the first unconsidered vertex and, when available, the second unconsidered vertex having associated therewith (1) a respective vertex intersection and (2) a respective straight line distance from the respective vertex intersection to the entrance intersection. Each of the respective vertex intersections is an intersection of (a) a street represented by the respective unconsidered vertex adjacent to the head-positioned vertex and (b) the street represented by the head-positioned vertex. In the alternate example, using this aspect, the first unconsidered vertex is the 3rd Street vertex that has (1) an associated respective vertex intersection in the intersection of 3rd Street and Avenue B and (b) an associated respective straight line distance from the intersection of 3rd Street and Avenue B to the intersection of 4th Street E and Avenue B. Similarly, in the alternate example, using this aspect, the second unconsidered vertex is the Diagonal Street vertex that has (1) an associated respective vertex intersection in the intersection of Diagonal Street and Avenue B and (b) an associated respective straight line distance from the intersection of Diagonal Street and Avenue B to the intersection of 4th Street E and Avenue B. The preference order in this aspect would then be according to the shorter of the straight line distances or arbitrary when the straight line distances are identical.

The preference order in another aspect sorts the paired vertices according to their physical distance from the destination location. The preference order in this aspect can be established by each of the first unconsidered vertex and, when available, the second unconsidered vertex having associated therewith (1) a respective vertex intersection and (2) a respective straight line distance from the respective vertex intersection to one of (a) the source location, when the ending street is the source street, and (b) the destination location, when the ending street is the destination street. Each of the respective vertex intersections is an intersection of (a) a street represented by the respective unconsidered vertex adjacent to the head-positioned vertex and (b) the street represented by the head-positioned vertex. In the alternate example, using this aspect, the first unconsidered vertex is the 3rd Street vertex that has an associated respective vertex intersection in the intersection of 3rd Street and Avenue B. Similarly, in the ongoing example, using this aspect, the second unconsidered vertex is the Diagonal Street vertex that has an associated respective vertex intersection in the intersection of Diagonal Street and Avenue B. In the alternate example, using this aspect, because the ending street is the source street, the 3rd Street vertex has an associated respective straight line distance from the intersection of 3rd Street and Avenue B to the user's location, and the Diagonal Street vertex has an associated respective straight line distance from the intersection of Diagonal Street and Avenue B to the user's location. This preference order in this aspect is according to the shorter of said straight line distances or arbitrary when said straight line distances are identical.

Eventually, the destination vertex is designated as seen, indicating that the destination vertex has been found and a desired solution path can be determined by recalling the predecessors of the vertices used to arrive at the destination vertex. In the alternate example, the 3rd Street vertex (a member of the 3rd Street vertex and 2nd Street vertex pair) would be preferred over the Diagonal Street vertex in the pair, either because, as can be seen on FIG. 4, the intersection of 3rd Street and Avenue B is closer to the intersection of 4th Street E and Avenue B than is the intersection of Diagonal Street and Avenue B, or because, as can be seen on FIG. 4, the intersection of 3rd Street and Avenue B is closer to the user's location at the intersection of 4th Street W and Avenue A than is the intersection of Diagonal Street and Avenue B. Further, in the alternate example, as shown on FIG. 5, the 3rd Street vertex has two adjacent vertices (the Avenue A vertex and the Avenue B vertex). Further, in the ongoing example, when the 3rd Street vertex is placed in the head-position of the FIFO queue, the Avenue B vertex will have been designated as seen, and as a predecessor of the 3rd Street vertex, and therefore the Avenue A vertex will be the only unconsidered vertex adjacent to the 3rd Street vertex. The algorithm will consider the Avenue A vertex, note that Avenue A is a member of the set of source streets, designate the Avenue A vertex as seen, and end the loop. The algorithm then determines the desired solution path by recalling that the 3rd Street vertex is the predecessor of the Avenue A vertex, that the Avenue B vertex is the predecessor of the 3rd Street vertex and that the 4th Street E vertex in the ongoing example (2nd Street vertex in the alternate example) is the predecessor of the Avenue B vertex. The computation module then determines the route as including the desired solution path.

As stated above, the consideration order, and the integral connection order and preference order, are established to bias the algorithm to determine the physically shortest path when multiple simplest paths exist. In the ongoing example, once the algorithm has arrived at the Avenue B vertex from the 4th Street E vertex, it can explore the 3rd Street, 2nd Street, Diagonal Street and 1st Street vertices. When using any of the desired preference ordering and enqueueing options discussed above, the algorithm would explore the vertices in that order, and would therefore ensure that 3rd Street is ultimately chosen as a step to Avenue A (a member of the set of source streets). It should be noted that for other maps, and other searches on the exemplary map, when using one preference ordering and/or enqueueing option versus another, the algorithm may not order vertices in the same order. Nevertheless, without the biasing ordering of the invention, an algorithm not so biased finds a path in G that is as simple as the path found by the invention, but that is physically longer than the path found by the invention (i.e., traverses additional physical distance). For example, an algorithm not so biased might choose 1st Street as a step to Avenue A, and therefore find a path in G that is as simple (i.e., has the same number of street changes) as the path depicted on the map in FIG. 4 and on the graph representation in FIG. 5, but that is physically longer (i.e., traverses additional physical distance).

In other embodiments, the computation module may not choose the simplest route initially discovered. In one aspect, the computation module finds a simplest route as a current candidate route and determines its "overhead ratio". The overhead ratio is defined as the ratio of the distance, along the current candidate route, between the source location and the destination location to the distance, along a straight line route, between the source location and the destination location. If the current candidate route's overhead ratio is below a desired ratio (a 1:1 ratio or any ratio above 1:1, but preferably between 1:1 and 3:1 and more preferably approximately $\sqrt{2}:1$), the current candidate route is designated as the desired route. If the current candidate route's overhead ratio is not below the desired ratio, the search continues. Inasmuch as the desired route includes a desired solution path, the candidate route may include a candidate solution path between the beginning street and the ending street. Therefore, in the algorithm, the consideration of each unseen vertex adjacent to the head-positioned vertex may include checking each candidate solution path to determine if the overhead ratio is below a desired ratio.

Accordingly, during each consideration, the algorithm in such an aspect, when the vertex under consideration is the destination vertex, would first designate the head-positioned vertex as a predecessor of said destination vertex and then determine a ratio of a distance along a candidate route between the source location and the destination location to a distance along a straight line route between said source location and said destination location. The candidate route for the iteration would include a current candidate solution path between the beginning street and the ending street. If the ratio is lower than a desired ratio, the algorithm would designate the current candidate solution path as the desired solution path, and would designate the destination vertex as seen. This designation of the destination vertex as seen would end the consideration loop, and the computation module would determine the desired route as including that desired solution path. When the vertex under consideration is not the destination vertex, the algorithm would designate the vertex under consideration as seen after the vertex under consideration has been considered, designate the head-positioned vertex as a predecessor of the vertex under consideration, and place the vertex under consideration in a tail position of the FIFO queue after the head-positioned vertex has been designated as the predecessor. The loop continues until a desired solution path is found. If no candidate solution path has an overhead ratio below the desired ratio, the physically shortest candidate solution path can be used.

In another aspect of such embodiments, the same procedure can be followed, but in addition, if the overhead ratio of the current candidate route is not below the desired ratio, the current candidate route is stored as a previous candidate route. As the search continues, any time a new route is discovered that has the same number of or more (preferably a minimum of 1 and a maximum of 2) street changes than the stored (i.e., previous) candidate route (and thus becomes a current candidate route), it either has an overhead ratio below the desired ratio and is immediately chosen, or does not. If it does not, and if the current candidate route has the same number of street changes as the previous candidate route, then the current candidate route is stored to take the place of the previous candidate route (to become the "previous candidate route" for the next iteration) if and only if the new route is physically shorter (distance along the new route) than the candidate route (distance along the candidate route). Alternatively, if the current candidate route has more (preferably a minimum of 1 and a maximum of 2) street changes than the previous candidate route, then current candidate new route is stored as the previous candidate route if and only if the current candidate route is physically shorter (distance along the current candidate route) than the previous candidate route (distance along the previous candidate route) by a desired ratio (any ratio less than 1:1, preferably less than 1:1 but greater than 0.5:1 and more preferably 0.7:1). If the current candidate route has more than the maximum number of street changes than the previous candidate route, then (due to the properties of the search algorithm discussed above as finding the simplest paths first before finding the more complicated paths), all subsequent routes will also have more than the maximum number of street changes than the previous candidate route. The computation module would then discard the current candidate route and choose the previous candidate route as the desired route.

Inasmuch as the desired route includes a desired solution path, the candidate route may include a candidate solution path between the beginning street and the ending street. Similarly, the current candidate route may include a current candidate solution path between the beginning street and the ending street, the previous candidate route may include a previous candidate solution path between the beginning street and the ending street.

Accordingly, during each consideration, the algorithm in such an aspect, when the vertex under consideration is the destination vertex and a previous candidate solution path between the beginning street and the ending street has not been designated, designates the head-positioned vertex as a predecessor of the destination vertex, designates the current candidate solution path as the previous candidate solution path, and terminates consideration of the vertex under consideration.

Alternately, during each consideration, the algorithm in such an aspect, when the vertex under consideration is the destination vertex and the previous candidate solution path has been designated, compares a distance along the current candidate solution path with a distance along the previous candidate solution path.

If the distance along the current candidate solution path is physically shorter than the distance along the previous candidate solution path (if not, the algorithm terminates consideration of the vertex under consideration), the algorithm compares a number of vertices in the current candidate solution path with a number of vertices in the previous candidate solution path. The algorithm then preferably performs one of three steps, and otherwise terminates consideration of the vertex under consideration. First, if the number of vertices in the current candidate solution path equals the number of vertices in the previous candidate solution path, the algorithm designates the head-positioned vertex as a predecessor of the destination vertex, designates the current candidate solution path as the previous candidate solution path, and terminates consideration of the vertex under consideration.

Second, if the number of vertices in the current candidate solution path is a minimum number (preferably 1) of vertices greater than the number of vertices in the previous candidate solution path, the algorithm determines a ratio of the distance along the current candidate solution path to the distance along the previous candidate solution path. If the ratio is lower than a desired ratio (e.g., any ratio less than 1:1, preferably less than 1:1 but greater than 0.5:1 and more preferably 0.7:1) (if not the algorithm terminates consideration of the vertex under consideration), the algorithm designates the head-positioned vertex as a predecessor of the destination vertex, designates the current candidate solution path as the previous candidate solution path, and terminates consideration of the vertex under consideration.

Third, if the number of vertices in the current candidate solution path is a maximum number of vertices greater than the number of vertices in the previous candidate solution path, the algorithm designates the previous candidate solution path as the desired solution path, designates the destination vertex as seen and terminates consideration of the vertex under consideration.

Alternately, during each consideration, the algorithm in such an aspect, when the vertex under consideration is not the destination vertex, designates the vertex under consideration as seen after the vertex under consideration has been considered, designates the head-positioned vertex as a predecessor of the vertex under consideration, places the vertex under consideration in a tail position of the FIFO queue after the head-positioned vertex has been designated as the predecessor, and terminates consideration of the vertex under consideration.

Once the computation module determines the route as the desired route, the desired route is preferably presented to the user. In one embodiment, the system of the invention further includes a presentation module adapted to generate and present navigational instructions for traversing the route. Preferably, the presentation module interprets the route as determined by the computation module into natural language navigational instructions. The presentation module may also or alternatively generate and present a map showing at least a portion of the route.

The instructions may include at least one of an instruction to read at least one of the mapped objects, an instruction to turn at one of the mapped objects, an instruction to pass by one of the mapped objects, and a description of one of the mapped objects. The mapped objects can be at least one of a business, a street, an intersection, a sign, a billboard, an advertisement, a map, a schedule, a landmark, a building, a transit station, and a government facility.

In some cases, the mapped object can be associated with a vendor that has arranged for the instructions to be presented. For example, a vendor may pay to have his or her business included in the set of instructions for advertising purposes.

The instructions may include at least one of instructions to move in a direction, instructions to turn in a direction, instructions to move a distance, instructions to move for a period of time, and/or instructions to continue to move in a particular direction on a different street. The instructions may include at least one of instructions to pay a toll, instructions to use at least one component of a mass transit system (e.g., a subway system), instructions to read a navigational reference (e.g., a map or sign), instructions to turn at a navigational reference (e.g., turn at a sign), and instructions to pass by a navigational reference (e.g., pass a sign for an exit off a highway). The instructions may include a description of the source location, the destination location and the navigational reference. Exemplary navigational references include one of the businesses, one of the streets, one of the nodes, a sign, a billboard, an advertisement, a map, a schedule, a landmark, a building, a transit station, and a government facility. The instructions may also include helpful redundancies as error checks, such as reminding the user of the street or streets at the source location and pointing out the names of other streets on some of the nodes traversed.

In some embodiments, the presentation module is adapted to generate and present the instructions using at least one of demographic information pertaining to the user, a preference of the user, a characteristic of the user, a characteristic of a handheld device being used by the user, information stored in the handheld device, and a characteristic of one of the businesses, one of the streets, and/or one of the nodes. For example, the user may provide demographic information and/or preferences that are used by the presentation module to present the instructions according to those preferences and/or tailored to the demographic information. Or, for example, a characteristic of the user may be determined by recording and analyzing the interaction between the user and the handheld device, and this information may be used to tailor the instructions to the user or present the instructions along with relevant advertisements. Or, for example, a characteristic of the handheld device may be determined automatically, and used to present the navigational instructions along with advertisement graphics instead of advertisement text. Such tailoring information can be stored on the handheld device or elsewhere in a manner accessible by the system for these purposes. Finally, characteristics of the businesses, characteristics of the streets, and characteristics of the nodes that the user is going to encounter along the route, and/or characteristics of other businesses, streets and/or nodes, may be used to tailor the navigational instructions to be presented along with advertisements, suggestions, and recommendations.

Figure 4:
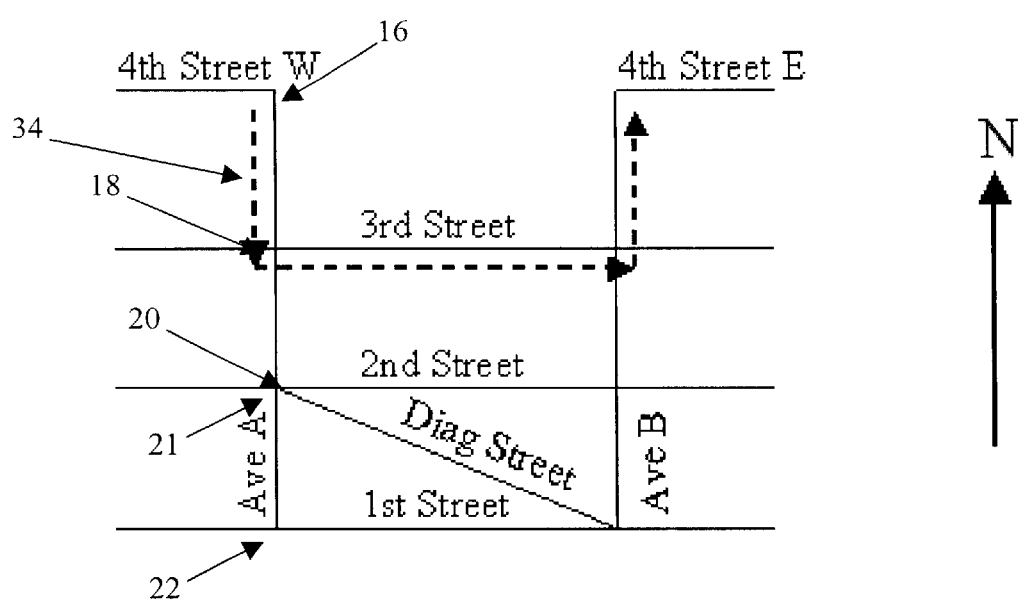
FIG. 4 shows the map of FIG. 2 illustrating a desired route.
Figure 5:
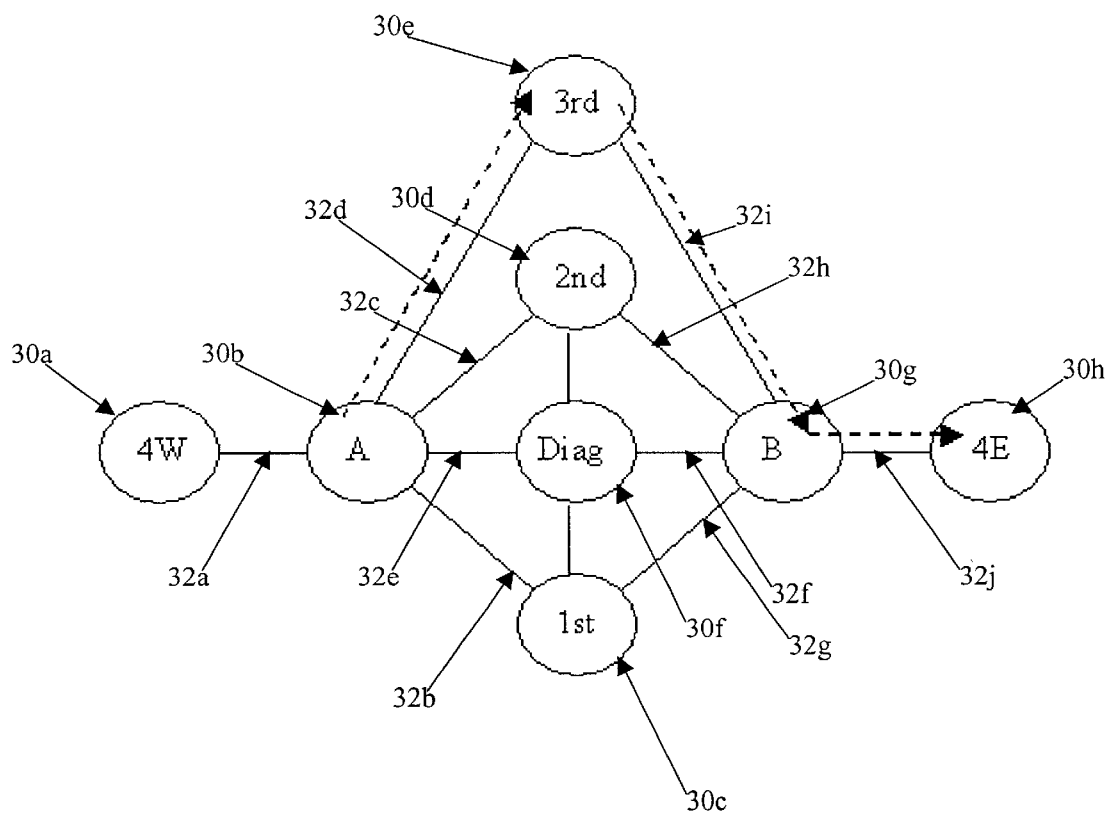
FIG. 5 illustrates the graph representation of FIG. 3 indicating a desired solution path found by the algorithm.

In the ongoing example, a desired route 34 is shown in FIG. 4. The instructions that would be presented could be rendered as: "From 4th Street W and Avenue A, go South on Avenue A for about ½ mile. Turn left onto 3rd Street and go another ½ mile. Turn left again onto Avenue B and go ¼ mile. Turn right onto 4th Street E and your destination is within 25 yards."

The computation module can be further adapted to interact with the user while executing the algorithm. In order for the computation module to exhibit such interactive responsiveness while it determines the route, the computation module can be adapted to provide status information to the user between two of the iterations sequentially executed by the algorithm. The two iterations may be successive or other iterations may be executed between the two iterations. Additionally or alternatively, the computation module can be adapted to check for a user request between two of the iterations. Again, the two iterations may be successive or other iterations may be executed between the two iterations. If the user request is to terminate the determination of the route, the computation module is preferably adapted to terminate the algorithm in response to that request. The computation module can be adapted to temporarily suspend the algorithm, respond to the user request, and subsequently resume the algorithm.

In certain aspects, the computation module can temporarily suspend the algorithm to execute an interface routine that checks for user requests to process. For example, the user may request that the determination of the route and/or the presentation of instructions be cancelled, in which case the algorithm and/or the presentation module functions are terminated and abandoned entirely. Or, for example, while the algorithm is suspended, the computation module may provide status updates to the user to indicate that the route determination is running correctly Those skilled in the art will recognize that the system and method of the invention have many applications, and that the invention is not limited to the representative embodiments disclosed herein. The scope of the invention is only limited by that of the claims appended hereto.

What is claimed is:

1. A system for determining a route, comprising a computation module adapted to:
  a) receive source location information and use said source location information to identify a source location and a source street associated with said source location;
  b) receive destination location information and use said destination location information to identify a destination location and a destination street associated with said destination location; and
  c) execute an algorithm for determining a route between said source location and said destination location, said route comprising a desired solution path; wherein:
    i) when at least two of a plurality of possible routes between said source location and said destination location require an identical minimum number of street changes, said algorithm is biased toward determining said route as a shortest route of said at least two of said routes:
  d) wherein said algorithm manipulates a graph representation having a plurality of vertices and a plurality of edges;
  e) each of said edges represents an adjacency between two of said vertices;
  f) said algorithm initially:
    i) designates a source vertex from said vertices, said source vertex representing a beginning street, said beginning street being one of said source street and said destination street,
    ii) designates a destination vertex from said vertices, said destination vertex representing an ending street, said ending street being the other of said source street and said destination street,
    iii) designates said source vertex as seen,
    iv) designates each remaining vertex as unseen, and
    v) places said source vertex in a head position of a first-in-first-out queue;
  g) said algorithm thereafter executes a loop while said destination vertex is designated as unseen and said queue is not empty, in which said algorithm:
    i) when all vertices adjacent to said head-positioned vertex are seen:
      1) removes said head-positioned vertex from said queue, and 2) when a next vertex is next in said queue, places said next vertex in said head position;
ii) when at least one vertex adjacent to said head-positioned vertex is designated as unseen:
1) considers in a consideration order each unseen vertex adjacent to said head-positioned vertex, and
2) after all of said unseen vertices adjacent to said head-positioned vertex have been considered:
a) removes said head-positioned vertex from said queue, and
b) when a next vertex is next in said queue, places said next vertex
in said head position;
h) each of said vertices cannot be simultaneously designated as both seen and unseen; and
i) said consideration order biases said algorithm toward determining said.

2. The system of claim 1, wherein said consideration of each unseen vertex adjacent to said head-positioned vertex comprises in the alternate and thereafter terminates:
a) when said vertex under consideration is said destination vertex:
i) designating said head-positioned vertex as a predecessor of said destination vertex,
ii) determining a ratio of a distance along a candidate route between said source location and said destination location, said candidate route comprising a current candidate solution path between said beginning street and said ending street, to a distance along a straight line route between said source location and said destination location, and
iii) when said ratio is lower than a desired ratio:
(1) designating said current candidate solution path as said desired solution path, and
(2) designating said destination vertex as seen; and
b) when said vertex under consideration is not said destination vertex:
i) designating said vertex under consideration as seen after said vertex under consideration has been considered,
ii) designating said head-positioned vertex as a predecessor of said vertex under consideration, and
iii) placing said vertex under consideration in a tail position of said queue after said head-positioned vertex has been designated as said predecessor.

3. The system of claim 2, wherein said desired ratio is approximately √2:1.

4. The system of claim 1, wherein said consideration of each unseen vertex adjacent to said head-positioned vertex comprises in the alternate and terminates otherwise:
a) when said vertex under consideration is said destination vertex and a previous candidate solution path between said beginning street and said ending street has not been designated:
i) designating said head-positioned vertex as a predecessor of said destination vertex,
ii) designating a current candidate solution path between said beginning street and said ending street as said previous candidate solution path, and
iii) terminating consideration of said vertex under consideration;
b) when said vertex under consideration is said destination vertex and said previous candidate solution path has been designated, comparing a distance along another current candidate solution path between said beginning street and said ending street with a distance along said previous candidate solution path, and terminating consideration of said vertex under consideration when not:
i) when said distance along said other current candidate solution path is shorter than said distance along said previous candidate solution path, comparing a number of vertices in said other current candidate solution path with a number of vertices in said previous candidate solution path, and performing in the alternate and otherwise terminating consideration of said vertex under consideration:
(1) when said number of vertices in said other current candidate solution path equals said number of vertices in said previous candidate solution path:
(a) designating said head-positioned vertex as a predecessor of said destination vertex,
(b) designating said other current candidate solution path as said previous candidate solution path, and
(c) terminating consideration of said vertex under consideration;
(2) when said number of vertices in said other current candidate solution path is a minimum number of vertices greater than said number of vertices in said previous candidate solution path, determining a ratio of said distance along said other current candidate solution path to said distance along said previous candidate solution path, and terminating consideration of said vertex under consideration when not:
(a) when said ratio is lower than a desired ratio:
(i) designating said head-positioned vertex as a predecessor of said destination vertex,
(ii) designating said other current candidate solution path as said previous candidate solution path, and
(iii) terminating consideration of said vertex under consideration; and
(3) when said number of vertices in said other current candidate solution path is a maximum number of vertices greater than said number of vertices in said previous candidate solution path, designating said previous candidate solution path as said desired solution path, designating said destination vertex as seen and terminating consideration of said vertex under consideration; and
c) when said vertex under consideration is not said destination vertex:
i) designating said vertex under consideration as seen after said vertex under consideration has been considered,
ii) designating said head-positioned vertex as a predecessor of said vertex under consideration,
iii) placing said vertex under consideration in a tail position of said queue after said head-positioned vertex has been designated as said predecessor, and
iv) terminating consideration of said vertex under consideration.

5. The system of claim 4, wherein said minimum number is 1, said maximum number is 2 and said desired ratio is 0.7:1.

6. The system of claim 1, wherein said consideration of each unseen vertex adjacent to said head-positioned vertex comprises:
a) designating said vertex under consideration as seen,
b) designating said head-positioned vertex as a predecessor of said vertex under consideration,
c) placing said vertex under consideration in a tail position of said queue after said head-positioned vertex has been designated as said predecessor, and d) terminating consideration of said vertex under consideration.

7. The system of claim 6, wherein said consideration order is established by:
   a) each unseen vertex adjacent to said head-positioned vertex having associated therewith a position in a connection order relative to said head-positioned vertex;
   b) pairing a first unconsidered vertex of said unseen vertices adjacent to said head-positioned vertex and, when available, a second unconsidered vertex of said unseen vertices adjacent to said head-positioned vertex,
      i) said first unconsidered vertex being an unconsidered vertex next in one of increasing connection order position and decreasing connection order position from an entrance connection order position,
      ii) said second unconsidered vertex being an unconsidered vertex next in the other of increasing connection order position and decreasing connection order position from the entrance connection order position, and
      iii) said entrance connection order position being:
         (1) when said head-positioned vertex is said source vertex, a connection order position corresponding to a connection order position, relative to said head-positioned vertex, of a vertex adjacent to said head-positioned vertex; and
         (2) when said head-positioned vertex is not said source vertex, a connection order position, relative to said head-positioned vertex, of said predecessor vertex of said head-positioned vertex;
   c) ordering according to a preference order said first unconsidered vertex and, when available, said second unconsidered vertex; and
   d) enqueing for consideration, according to said preference order, at least one of said first unconsidered vertex and said second unconsidered vertex.

8. The system of claim 7, wherein enqueing comprises enqueing for consideration, according to said preference order, both said first unconsidered vertex and said second unconsidered vertex.

9. The system of claim 7, wherein said preference order is:
   a) established by:
      i) said head-positioned vertex having associated therewith an entrance intersection, said entrance intersection being intersected by a street represented by said head-positioned vertex;
      ii) each of said first unconsidered vertex and, when available, said second unconsidered vertex having associated therewith:
         (1) a respective vertex intersection, each of said respective vertex intersections being an intersection of:
            (a) a street represented by said respective unconsidered next vertex, and
            (b) said street represented by said head-positioned vertex; and
         (2) a respective straight line distance from said respective vertex intersection to said entrance intersection; and
   b) according to the shorter of said straight line distances.

10. The system of claim 7, wherein said preference order is:
    a) established by each of said first unconsidered vertex and, when available, said second unconsidered vertex having associated therewith:
       i) a respective vertex intersection, each of said respective vertex intersections being an intersection of:
          (1) a street represented by said respective unconsidered next vertex, and
          (2) a street represented by said head-positioned vertex; and
       ii) a respective straight line distance from said respective vertex intersection to one of:
          (1) said source location, when said ending street is said source street, and
          (2) said destination location, when said ending street is said destination street; and
    b) according to the shorter of said straight line distances.

11. The system of claim 7, wherein said connection order positions are established by:
    a) a street represented by said head-positioned vertex having associated therewith a first end and a second end;
    b) each vertex adjacent to said head-positioned vertex having associated therewith:
       i) a respective vertex intersection, each of said respective vertex intersections being an intersection of:
          (1) a street represented by said respective vertex adjacent to said head-positioned vertex and
          (2) said street represented by said head-positioned vertex; and
       ii) a respective distance from said respective vertex intersection to one of said first end and said second end along said street represented by said head-positioned vertex; and
    c) ordering said vertices adjacent to said head-positioned vertex according to increasing said respective distances.

12. The system of claim 11, wherein ordering according to increasing said respective distances comprises assigning a numerical value to each of said connection order positions to indicate a connection order position of each of said vertices adjacent to said head-positioned vertex relative to one another.

* * * * *

UNITED STATES PATENT AND TRADEMARK OFFICE
CERTIFICATE OF CORRECTION

| | |
|---|---|
| PATENT NO. | : 6,480,785 B1 |
| APPLICATION NO. | : 09/655818 |
| DATED | : November 12, 2002 |
| INVENTOR(S) | : David S. Joerg et al. |

It is certified that error appears in the above-identified patent and that said Letters Patent is hereby corrected as shown below:

Claim 1, Col. 19, lines 16-17:

From: "i) said consideration order biases said algorithm toward determining said."

To: "i) said consideration order biases said algorithm toward determining said shortest route."

Signed and Sealed this

Thirtieth Day of November, 2010

David J. Kappos
*Director of the United States Patent and Trademark Office*